Figure 1:
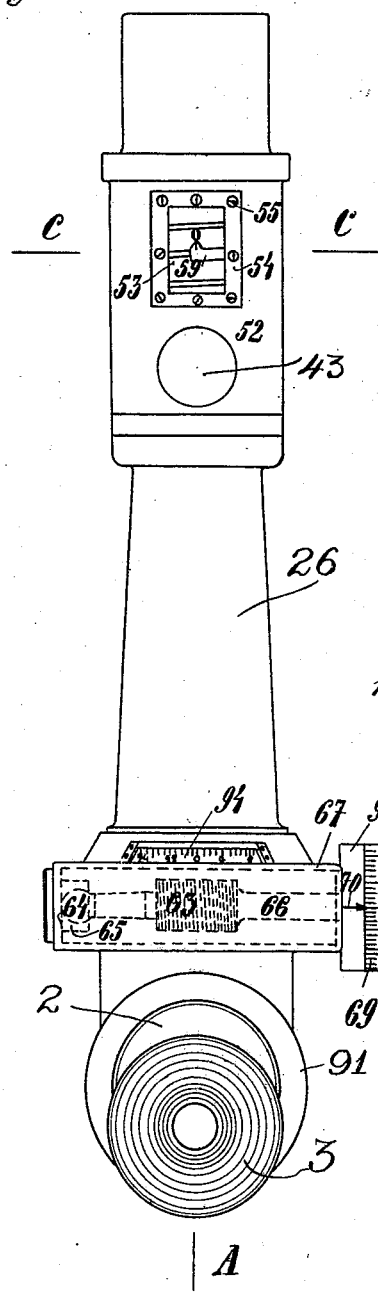

C. MÖLLER.
TELESCOPE.
APPLICATION FILED FEB. 1, 1910.

988,279.

Patented Mar. 28, 1911.
2 SHEETS—SHEET 1.

Witnesses:

Inventor:
Carl Möller

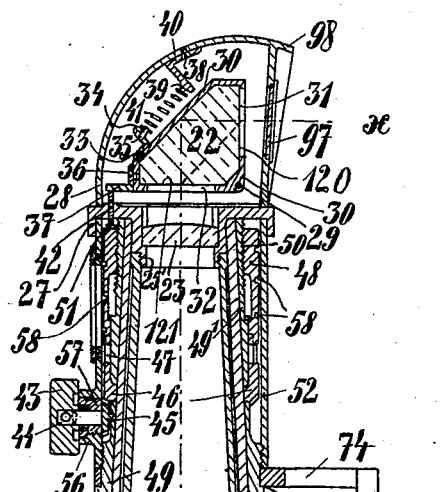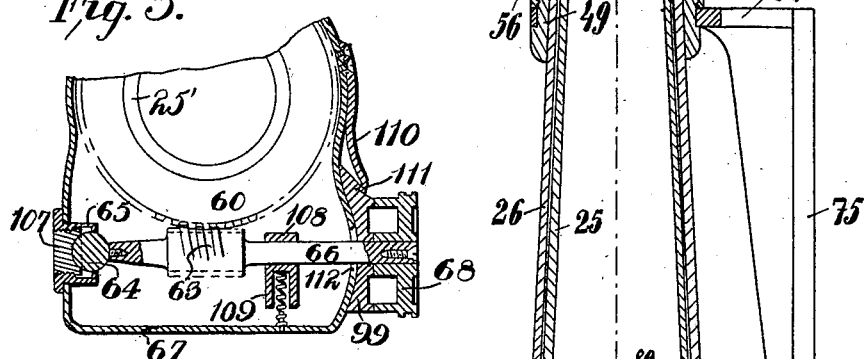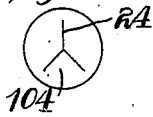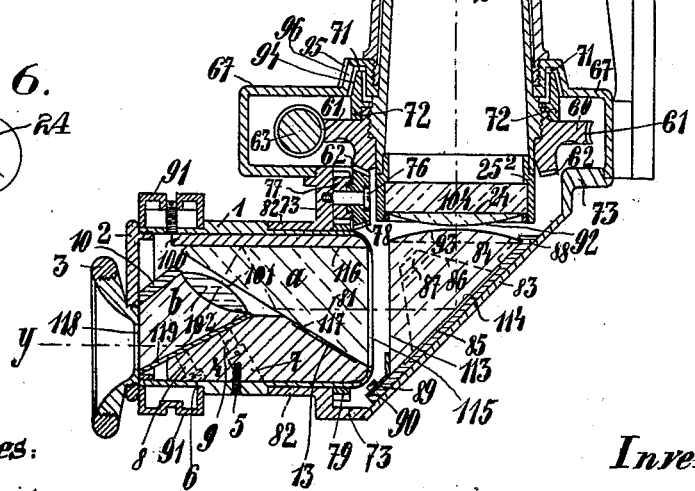

UNITED STATES PATENT OFFICE.

CARL MÖLLER, OF IHRINGSHAUSEN, NEAR CASSEL, GERMANY, ASSIGNOR TO AKT.-GES. HAHN FÜR OPTIK UND MECHANIK, OF IHRINGSHAUSEN, NEAR CASSEL, GERMANY.

TELESCOPE.

988,279.

Specification of Letters Patent.   Patented Mar. 28, 1911.

Application filed February 1, 1910.   Serial No. 541,306.

*To all whom it may concern:*

Be it known that I, CARL MÖLLER, a citizen of the Empire of Germany, residing at Ihringshausen, near Cassel, in the Empire of Germany, have invented a new and useful Telescope, of which the following is a specification.

My invention relates to improvements in telescopes adapted to measure angles and provided with turnable reflectors. The telescopes of such a kind in general present the defect, that the aiming device determined by the centers of the objective and the sighting mark is subjected to influences of movable optical parts between the object and the sighting mark, so that on the motion transmitting mechanisms failing to operate with absolute exactness or getting out of order the aiming device is diverted in a manner which can not be controlled. The improvements according to my invention avoid this defect.

The chief improvement consists in disposing both the objective and the sighting mark in a single tube turnable around a vertical axis in a stationary frame, so that the aiming device is determined by this tube.

Another improvement consists in disposing in the said tube all the prisms serving for deflecting the rays of light between the object and the sighting mark, so that the path of the light from the object to the sighting mark is protected from every deflection which could not be controlled. More particularly the reflector receiving the rays of light from the object is so connected with the said turnable tube as to be compelled to partake in its rotation while maintaining its position in relation to the objective and the sighting mark. Preferably this reflector is mounted in a hood upon the said turnable tube to rock around an axis at right angles to its plane of incidence.

A third improvement consists in a horizontal ocular tube, which is mounted to turn in the frame beyond the sighting mark and is adapted not only to produce a magnified positive virtual image of the field of sight, but also to erect this image, since the sighting mark is obliged to simultaneously turn with the field of sight. The purpose of this improvement is to obtain as large as possible a field of sight, the reflecting faces for the lateral correction of the image being provided at the reflector of incidence and the reflecting faces and the spherical faces required for the magnification and erection of the image being combined to form an ocular reversing system with broken optical axis, which system although simultaneously rotating with the reflector of incidence around the vertical axis of the tube nevertheless always furnishes an erected positive image.

A fourth improvement consists in disposing the means for measuring the angle of turn of the vertical tube at an opening in a casing surrounding the tube.

The construction so arranged presents the advantage that owing to the direct connection of the prisms and lenses the losses of reflection are reduced to a minimum.

I will now proceed to describe my invention with reference to the accompanying drawings, in which—

Figure 7:
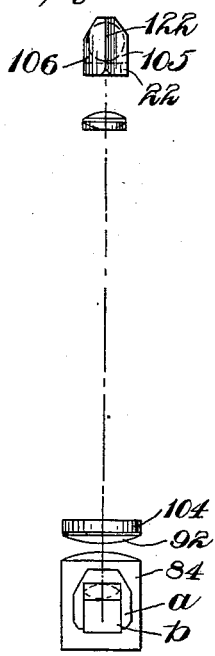
Figure 5:
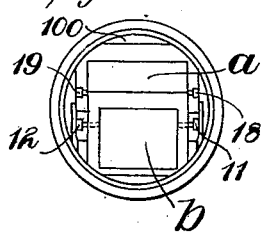
Figure 8:
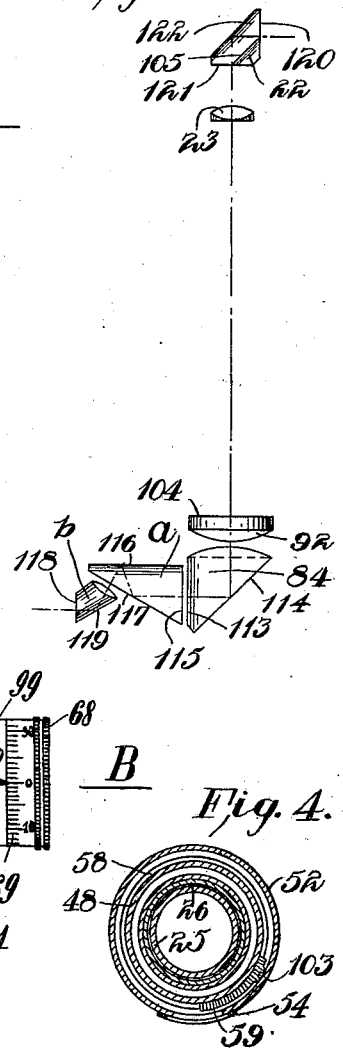
Figure 4:
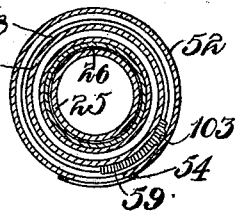

Figure 1 is a front elevation of the improved telescope, Fig. 2 is a vertical longitudinal section through the same on the line A—A in Fig. 1, Fig. 3 is a horizontal section through the same on the line B—B in Fig. 1, Fig. 4 is a horizontal section through the line C—C in Fig. 1, Fig. 5 is a front view of the ocular tube (when looked at from the left in Fig. 2), after the cover and a knurled knob have been taken off, Fig. 6 is a view of the sighting mark, Fig. 7 is a front elevation on a reduced scale of the prisms and lenses and corresponds to Fig. 1, and Fig. 8 is a side elevation of the same and corresponds to Fig. 2.

Similar characters of reference refer to similar parts throughout the several views.

75 denotes a support of any known construction, which is adapted to be fastened on some standard. The upper horizontal plate 74 of the support 75 may have a circular hole, in which an annular part 49 engages. This part 49 is rigidly connected by soldering or otherwise with a vertical conical tube 26, the lower wide end of which is rigidly connected with a casing 67 by means of a screw-thread or in any other known manner. The casing 67 is rigidly connected with the lower end of the support 75 by means of screws or otherwise, and also with a lower prism casing 73 by means of a screw-thread. Fastened on the upper part of the conical tube 26 by soldering or otherwise is an annular part 49¹ and a ring 46 engages with its inner projection between the two parts 49 and 49¹, so that it is permitted to turn, but is prevented from longitudinal motion. The part 49¹ is provided on its upper outside with a screw-thread 50, on which a tubular nut 48 engages. This nut 48 is on its lower inside provided with one or several longitudinal grooves, in which as many pins 47 at the ring 46 engage, so that the nut 48 is obliged to partake in the rotation of the part 46, while by the screw-thread 50 it is moved up or down, if the part 46 is turned in one or the other direction. Preferably a protecting tube 52 is put over the nut 48 and is connected with the part 49 by means of a screw-thread. The protecting tube 52 is provided with an internally screw-threaded connection 56, in which a cover 57 engages. This cover 57 can be turned by means of a suitable screw-key engaging in its holes shown in Fig. 2 and has a central hole, in which the shaft 44 of a small bevel wheel 45 is mounted to turn. The rear end of the shaft 44 forms a pivot which engages in a corresponding hole in the part 49. A knurled knob 43 is in any known manner fastened on the shaft 44, and as the small bevel wheel 45 meshes with bevel teeth provided at the lower end of the ring 46, it will be understood that by turning the knob 43 in one or the other direction the nut 48 can be turned in one or the other direction and at the same time moved up or down.

In Figs. 1 and 2 the knurled knob 43 is shown to be disposed at the front of the protecting tube 52, but where so preferred, the knob 43 may be placed on the right or left side, so that it can be better reached with the fingers and turned. The protecting tube 52 is provided with a rectangular opening 53, through which the outside of the nut 48 appears. The opening 53 may be covered with a transparent sheet in a suitable frame 54, which can be fastened on the tube 52 by means of screws 55. The tube 52 is on its inside provided with a vertical rib 103 parallel to one side of the opening 53 and an indicator 59 is guided by this rib 103 (Fig. 4). The indicator 59 engages with a suitable rib in a helical groove 58 cut into the outside of the nut 48, so that it is thereby moved upward or downward on the nut 48 being turned in one or the other direction. The indicator 59 works with a scale provided on the outside of the nut 48. A conical tube 25 is mounted in the vertical tube 26 and in a hole of the casing 67 to turn and is at the upper end connected by means of a screw-thread with an annular plate 25¹, which bears on the upper edges of the tube 26, the part 49¹ and the protecting tube 52 and has a flange 27 overlapping the tube 52. As the lower end of the tube 25 bears with a shoulder against the inside of the casing 67, it is obvious, that in this manner the tube 25 is prevented from longitudinal motion and is only permitted to turn around its vertical axis 80. An objective 23 is secured in the plate 25¹ and is shown to have an upper convex surface and a lower plain face. A ring 25² is fastened in the lower end of the tube 25 and contains a glass disk 104 with a sighting mark 24 (see Fig. 6) engraved or photographed on its lower face and a plano-convex lens 92 beneath the disk 104. It will be seen, that the objective 23 and the sighting mark 24 with the lens 92 are thus invariably secured in the vertical conical tube 25, which is a feature of my invention.

On the upper annular plate 25¹ is fastened by soldering or otherwise a hood 28, in which a prism casing 30 is mounted to rock on a rear shaft 29. Fastened on the front of the casing 30 by means of a screw 36 is an angle-piece 37, against which a vertical bolt 42 is made to bear from below. This bolt 42 is guided in a hole in the plate 25¹ and slides with its foot 51 on the upper end face of the nut 48. When the nut 48 is turned in one direction by the knob 43, the prism casing 30 is to be turned in the respective direction through an angle of for example one degree for every complete revolution of the nut 48, so that by means of the indicator 59 as small an angle as one minute can be read off the scale on the nut 48. On the upper inclined side of the prism casing 30 is fastened by means of a screw 33 an angle-piece 35 which is provided with a pointed projection 34. On the inside of the hood 28 is fastened by means of a screw 38 an angle-piece 40 provided with a pointed projection 39, and a helical spring 41 is inserted between the two angle-pieces 35 and 40 while surrounding their projections 34 and 39. The spring 41 is adapted to press the angle-piece 37 on the bolt 42, so as to prevent the casing 30 from shaking.

The casing 30 contains a reflector 22 of incidence and has two circular openings 31 and 32, through which the rays of light can pass. The reflector 22 is a prism having four operative faces, namely two transmitting faces 120 and 121 at right angles to one another and two reflecting faces 105 and 106 at right angles to one another, the line of intersection 122 of the two reflecting faces 105 and 106 making an angle of forty-five degrees with the transmitting faces 120 and 121, of which one 121 is normally at right angles to the axis 80 of the tube 25. The line of intersection of the two transmitting faces 120 and 121, which is the axis of the shaft 29, makes equally an angle of forty-five degrees with the reflecting faces 105 and 106. The lower rear edge of the prism 22 is beveled off, so as to leave space for the material of the casing 30, in which the shaft 29 is located. The prism 22 is secured in the casing 30 in any known manner. Preferably the hood 28 is closed at the rear with a nearly vertical window 97, so as to protect the reflector 22 from the influence of the weather. The hood 28 is also provided with an extension 98, so as to keep rain as much as possible off from the window 97.

Fastened on the lower end of the vertical tube 25 by means of a screw-thread and a shoulder or otherwise is a worm wheel 60, which is made in one with a large bevel wheel 62. The worm wheel 60 can mesh with a worm 63, which is shown to be made in one with its shaft 66 and to be provided with a globular pivot 64. The latter is mounted to turn in a suitable bearing 65 screwed into the casing 67 and is protected in the bearing 65 by a cover 107 from endwise motion. The shaft 66 is mounted to turn in a bearing 99 which can be shifted on the casing 67 along an arc-shaped surface (Fig. 3), the center of which coincides with that of the globular pivot 64. The shaft 66 also turns in a pusher 108 (Fig. 3), which is pressed toward the worm wheel 60 by a helical spring 109, that is inserted in a hole of the pusher and bears against the inside of the casing 67. A leaf spring 110 is fastened on the outside of the casing 67 and engages with its tapering end 111 in a notch provided in the bearing 99. A slot 112 is provided in the casing 67 for permitting the shaft 66 to move horizontally. The shaft 66 carries at the outer end a knurled knob 68 by means of which it can be turned in one or the other direction. The knob 68 carries a scale 69 and an indicator 70 is provided on the bearing 99. The nave of the worm wheel 60 is rigidly connected with a ring 72 by means of a screw-thread and a shoulder or otherwise. The upper part of the ring 72 is on the outside made conical and is provided with a scale 94, which appears through an opening 96 in the casing 67, the latter being for this purpose provided with an annular recess 71, in which the ring 72 engages. Preferably the opening 96 is covered with a bent glass plate 95 as a window and the indicator for the scale 94 may be provided either in the upper inside or in the lower inside of the opening 96. By means of the two scales 94 and 69 it is possible to read off to a nicety the angle through which the worm wheel 60 and therewith the tube 25 is turned in one or the other direction. A pin 76 is provided on the inside of the casing 73 and on this pin a pinion 77 and a small bevel wheel 78 are mounted to turn. The bevel wheel 78 meshes with the large bevel wheel 62 and is rigidly connected with the pinion 77 by means of a screw-thread or otherwise. The casing 73 is made in one with a tubular connection 82, in which an ocular tube 1 is mounted to turn. This tube 1 bears with a shoulder against the connection 82 and is prevented from longitudinal motion by a gear wheel 79 fastened on it and bearing against the inside of the casing 73. The gear wheel 79 meshes with the pinion 77 alrady mentioned. The front end of the tube 1 carries a knurled knob 91, by means of which it can be turned in one or the other direction. Obviously this is possible only after the worm 63 has been withdrawn from the teeth 61 of the large worm wheel 60, which is rendered possible by the construction described of the bearings of the shaft 66. When the knurled knob 68 is seized with the fingers and is pushed to the front, the tapering end 111 of the leaf spring 110 will get out of the corresponding notch in the bearing 99, whereupon the knurled knob 91 can be seized for rapidly turning the ocular tube 1 and thereby also the tube 25, until the indicator at the scale 94 points approximately at the desired figure, whereupon the shaft 66 is returned to its initial position and the knurled knob 68 is turned, until the indicator 70 at the scale 69 indicates, that the tube 25 with all the parts in it has been turned through the desired exact angle.

The casing 73 is closed with an inclined plate 83 soldered or otherwise fastened on it. On the inside of the plate 83 is fastened by soldering or otherwise a chair for the second reflector 84. The chair consists of a plate 88 and two triangular side parts 86. In order to reduce the working of the chair to a minimum, the plate 88 is preferably provided with a recess 85, while the two side parts 86 are made to touch the reflector 84 only on a small surface 87 each. The reflector 84 is a triangular prism having three operative faces, namely a reflecting face 114 at an angle of 45° to both the axis 80 of the tube 25 and the axis 81 of the ocular tube 1, further a vertical plane face 113 and an upper spherical face 93, which latter is in proximity of the lens 92. The prism 84 is on the plate 88 secured against shifting by means of an upper projection on the plate 88 and by an angle-piece 90 fastened on the plate 88 by screws 89.

The ocular tube 1 contains a bed 4 of any suitable material, in which a prism $a$ and a glass body $b$ are embedded. The prism $a$ has three operative faces, namely a vertical plane face 115 in proximity of that 113 of the reflector 84 at right angles to the axis 81, a reflecting face 116 parallel to the axis 81 and a large reflecting face 117 at an angle of 30° to the same. As Fig. 5 shows, the two upper edges of the prism $a$ are rounded off so that the prism $a$ can be introduced into the tube 1. Preferably a segmental piece 100 of elastic material, such as cork or the like, is inserted between the inside of the tube 1 and the upper reflecting face 116 of the prism $a$ for counteracting the effects of any shock given to the instrument. In order to reduce to a minimum the working of the faces of the recess in the bed 4, in which the prism $a$ is to be embedded, a recess 13 may be provided. The glass body $b$ is rectangular in cross section and has three operative faces, namely a plane face 118 at right angles to the axis 81 of the tube, a lower reflecting face 119 at an angle of 30° to the said axis, and a spherical surface 101 in proximity of the large reflecting face 117 of the prism $a$. Where so preferred, the spherical face 101 may be one side of a lens 102 fastened in the body $b$. The upper face of the body $b$ may be at an angle of 45° to the axis of the tube 1. Preferably the glass body $b$ is disposed in a tubular frame 10 of corresponding shape and is therein adjusted by means of adjusting screws 11, 12, 18, 19. The frame 10 in turn is embedded in a suitable recess of the bed 4 and is therein secured by means of screws 8 and 9 introduced through inclined holes 6 and 7. The bed 4 is secured in the tube 1 by means of a screw 5 or the like. The tube 1 is closed with a cover 2 of any known construction and is provided with an eccentric tubular connection 3, to which the eye can be applied for viewing the image.

When the telescope occupies its position shown and when the prism casing 30 is correctly adjusted, a central ray of light $x$ emanating from some object and impinging upon the rear face 120 of the reflector of incidence 22 will be reflected by the inclined edge 122 of the latter, so that it passes through the vertical axis 80 of the tube 25, whereupon it will be reflected by the lower reflecting face 114 of the reflector 84, so that it passes in the horizontal axis 81 of the tube 1, until it is totally reflected by the lower reflecting face 117 of the prism $a$ and passes in the direction of the dotted line to the upper reflecting face 116, from which it will be reflected and sent in the direction of the dotted line at right angles to the lower reflecting face 117 of the prism $a$ through the spherical surface 101, until it is totally reflected by the lower reflecting face 119 of the body $b$ and is sent forward in a direction parallel to the axis 81 of the tube 1, as is indicated by the dotted line $y$.

When the telescope is correctly focused, the real image of the field of sight produced by the objective 23 will be in the plane of the sighting mark 24, and the images of all vertical lines in the field of sight will be parallel to that plane which passes through the optical axis of the telescope, that is the axis 80, and is at right angles to the vertical face of the reflector of incidence 22.

The reflection of the image in the plane of the sighting mark 24 by the lower reflecting face 114 of the prism 84 furnishes a virtual image of the field of sight, which image is in a vertical plane behind the reflecting face 114 and will rotate on the tube 25 with the reflector of incidence 22 being turned around the vertical axis 80. The axis of rotation of the virtual image coincides with the mechanical axis of the ocular tube 1, that is the axis 81. The ratio of the gearing 79, 77, 78, 62 connecting the tubes 1 and 25 should be so made, that the angle of rotation of the tube 1 is half that of the tube 25, then the reflecting faces 117, 116 and 119 will during the simultaneous rotation of the two tubes 1 and 25 correct the rotating virtual image behind the reflecting face 114, so that the image appearing in the viewing tubular connection 3 of the ocular tube 1 will always remain erect in spite of the rotation of the virtual image. The lens 92 and the spherical faces 93 and 101 or the lens 102 serve to magnify the image.

In order to be able to see objects above or below the horizontal plane of the normal central ray of light $x$ the knob 43 can be turned in one or the other direction, whereby in the manner described above the reflector of incidence 22 can be turned around the horizontal shaft 29 through a small angle (of say 5°) upward or downward. This angle of turn can be measured by means of the indicator 59 and the scale on the nut 48 as explained above.

The telescope described can be varied in many respects without departing from the spirit of my invention. For example the reflector of incidence 22 may receive a single reflecting face similar to that 114 of the reflector 84, so that it does not laterally reverse the image, while the reflector 84 on the contrary receives in place of its single reflecting face 114 two reflecting faces similar to those 105 and 106 of the reflector 22 of incidence, so that the image can be laterally corrected in the viewing tubular connection 3 of the ocular tube 1.

I claim:

1. In a telescope of the herein described class, the combination with a frame, of a tube mounted in said frame to turn while prevented from longitudinal motion, an objective fastened in said tube at one end, a sighting mark fastened in said tube at the other end, a hood rigidly connected with the end of said tube containing said objective, and a prism of incidence in said hood having four operative faces, namely a pair of transmitting faces and a pair of reflecting faces, the faces of each pair being at right angles to each other and the line of intersection of the faces of one pair making an angle of forty-five degrees with the faces of the other pair.

2. In a telescope of the herein described class, the combination with a frame, of a tube mounted in said frame to turn while prevented from longitudinal motion, an objective fastened in said tube at one end, a sighting mark fastened in said tube at the other end, a hood rigidly connected with the end of said tube containing said objective, a prism of incidence having four operative faces, namely a pair of transmitting faces and a pair of reflecting faces, the faces of each pair being at right angles to each other and the line of intersection of the faces of one pair making an angle of forty-five degrees with the faces of the other pair, this prism of incidence being adapted to rock in said hood about the line of intersection at right angles to the axis of said tube, means for rocking said prism of incidence, and means for measuring the angle of turn of said prism of incidence.

3. In a telescope of the herein described class, the combination with a frame, of a main tube mounted in said frame to turn, an objective fastened in said main tube at one end, a sighting mark fastened in said main tube at the other end, a plano-convex lens fastened in said main tube in proximity of said sighting mark without the latter, a hood rigidly connected with the end of said main tube containing said objective, a reflector in said hood, a second reflector in said frame in proximity of said lens, an ocular tube mounted in said frame to turn around its axis at right angles to the axis of said main tube, a gearing connecting said main tube with said ocular tube, and means for measuring the angle of turn of said main tube, one of said two reflectors having four operative faces, namely a pair of transmitting faces and a pair of reflecting faces, the faces of each pair being at right angles to each other and the line of intersection of the faces of one pair making an angle of forty-five degrees with the faces of the other pair.

4. In a telescope of the herein described class, the combination with a frame, of a main tube mounted in said frame to turn, an objective fastened in said main tube at one end, a sighting mark fastened in said main tube at the other end, a plano-convex lens fastened in said main tube in proximity of said sighting mark without the latter, a hood rigidly connected with the end of said main tube containing said objective, a reflector adapted to rock in said hood about an axis at right angles to the axis of said main tube, means for rocking said reflector, means for measuring the angle of turn of said reflector, a second reflector in said frame in proximity of said lens, an ocular tube mounted in said frame to turn around its axis at right angles to said main tube, a gearing connecting said main tube with said ocular tube, and means for measuring the angle of turn of said main tube, one of said two reflectors having four operative faces, namely a pair of transmitting faces and a pair of reflecting faces, the faces of each pair being at right angles to each other and the line of intersection of the faces of one pair making an angle of forty-five degrees with the faces of the other pair.

5. In a telescope of the herein described class, the combination with a frame, of a main tube mounted in said frame to turn, an objective fastened in said main tube at one end, a sighting mark fastened in said main tube at the other end, a plano-convex lens fastened in said main tube in proximity of said sighting mark without the latter, a hood rigidly connected with the end of said main tube containing said objective, a prism of incidence in said hood having four operative faces, namely a pair of transmitting faces and a pair of reflecting faces, the faces of each pair being at right angles to each other and the line of intersection of the faces of one pair making an angle of forty-five degrees with the faces of the other pair, one transmitting face being parallel to and in proximity of said objective, a reflector in said frame having three operative faces, namely a spherical face in proximity of said lens, a reflecting face at an angle of forty-five degrees to the axis of said main tube and a transmitting face parallel to the axis of said main tube, an ocular tube mounted in said frame to turn around its axis at right angles to the transmitting face of said reflector, a gearing connecting said main tube with said ocular tube, and means for measuring the angle of turn of said main tube.

6. In a telescope of the herein described class, the combination with a frame, of a main tube mounted in said frame to turn, an objective fastened in said main tube at one end, a sighting mark fastened in said main tube at the other end, a plano-convex lens fastened in said main tube in proximity of said sighting mark without the latter, a hood rigidly connected with the end of said main tube containing said objective, a prism of incidence having four operative faces, namely a pair of transmitting faces and a pair of reflecting faces, the faces of each pair being at right angles to each other and the line of intersection of the faces of one pair making an angle of forty-five degrees with the faces of the other pair, this prism of incidence being adapted to rock in said hood about the line of intersection of the transmitting faces at right angles to the axis of said main tube, means for rocking said prism of incidence, means for measuring the angle of turn of said prism of incidence, a reflector in said frame having three operative faces, namely a spherical face in proximity of said lens, a reflecting face at an angle of forty-five degrees to the axis of said main tube and a transmitting face parallel to the axis of said main tube, an ocular tube mounted in said frame to turn around its axis at right angles to the transmitting face of said reflector, a gearing connecting said main tube with said ocular tube, and means for measuring the angle of turn of said main tube.

CARL MÖLLER.

Witnesses:
HERMANN JOACHIM,
ADOLF DÖLL.